Figure 1:
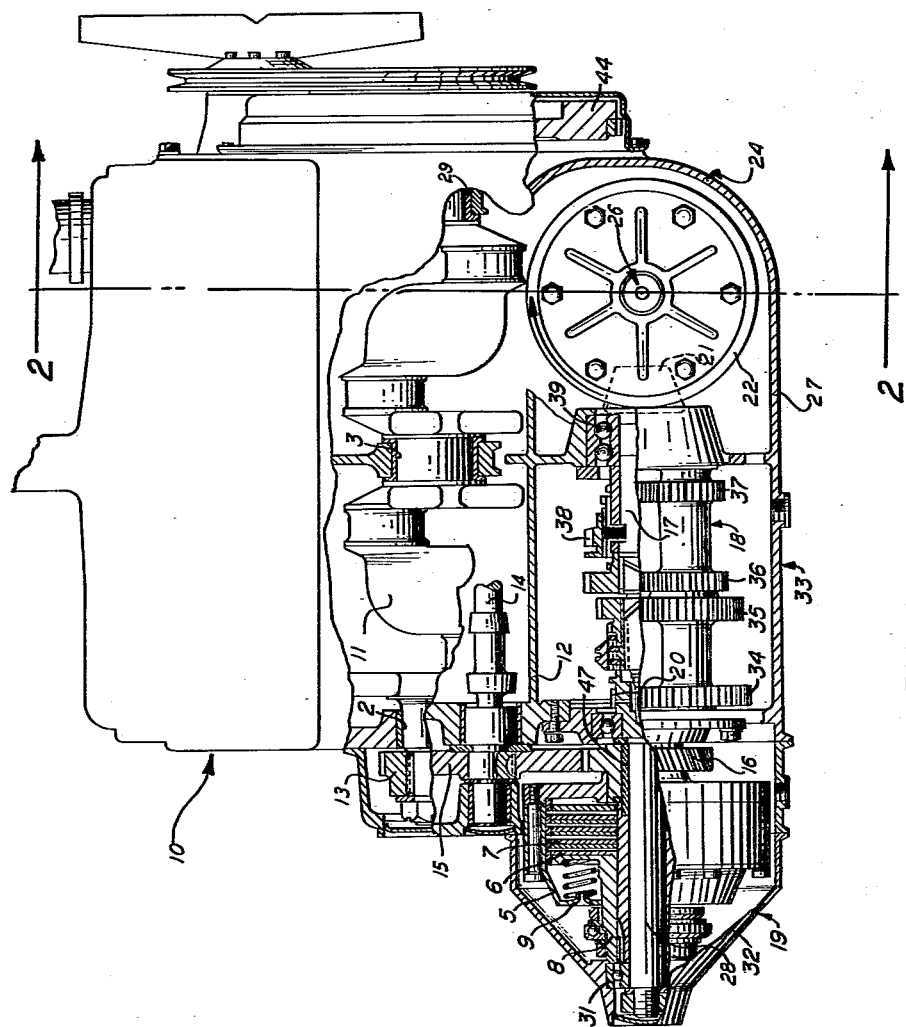

March 3, 1964    L. G. BOEHNER ETAL    3,122,944
INTEGRATED POWER UNIT

Filed March 16, 1961    3 Sheets-Sheet 1

LUDWIG G. BOEHNER
ALEXANDER BALBASCHEWSKI
INVENTORS

BY *John R. Faulkner*
*Clifford L. Sadler*

ATTORNEYS

March 3, 1964

L. G. BOEHNER ETAL 3,122,944

INTEGRATED POWER UNIT

Filed March 16, 1961

3 Sheets-Sheet 2

LUDWIG G. BOEHNER
ALEXANDER BALBASCHEWSKI
INVENTORS

BY John R. Faulkner
Clifford L. Sadler

ATTORNEYS

March 3, 1964

L. G. BOEHNER ETAL 3,122,944

INTEGRATED POWER UNIT

Filed March 16, 1961

3 Sheets-Sheet 3

LUDWIG G. BOEHNER
ALEXANDER BALBASCHEWSKI
INVENTORS

BY John R. Paulkner
Clifford L. Sadler

ATTORNEYS

United States Patent Office 3,122,944
Patented Mar. 3, 1964

3,122,944
INTEGRATED POWER UNIT
Ludwig G. Boehner, Braunschweig, and Alexander Balbaschewski, Cologne, Germany, assignors to Ford Motor Company, Dearborn, Mich., a corporation of Delaware
Filed Mar. 16, 1961, Ser. No. 96,164
8 Claims. (Cl. 74—700)

The present invention relates to an integrated power unit for a motor vehicle and more particularly to such a device having a motor, a clutch, a transmission, and a differential gear unit assembled as a single package. The output of the power unit comprises a pair of half-shafts that extend laterally from the sides of the unit.

In a motor vehicle having an engine located in close proximity to the driving axles it is rather difficult to provide an integrated power unit that will comply with fundamental automobile engineering practices. For example, it is objectionable to have the distance between the center of gravity of the engine and the driving axle too great. If this dimension is excessive and the center of gravity is disposed on the side of the driving axle away from the undriven axle of the vehicle, there is serious danger of unequal distribution of loads between the two axles. If the engine is disposed above the driving axle the center of gravity for the whole vehicle may be so high that stability, ride and handling characteristics are adversely affected. If the center of gravity of the engine is located on the side of the driving axle towards the undriven axle, then interference with the passenger compartment may occur. These undesirable consequences are usually expected in unit power plant applications employing multi-cylinder in-line engines.

To avoid the foregoing discussed disadvantages, this invention provides a unitized power plant having an engine that is longitudinally disposed with its bank of cylinders tilted away from the vertical and in which the differential, transmission, and clutch portions are located beneath and to one side of the engine crankshaft. The transmission and differential are disposed substantially between the front and rear crankshaft main bearings so that the cylinder block and crankcase may form a unit with the transmission and differential gear housings. The clutch and clutch housing are situated outboard of the block. A coaxial shaft arrangement permits the input and output of the clutch to be located on the same side of the housing.

In order to attain a small height in accordance with this invention the engine is inclined away from the vertical. The axis of the differential ring gear and the driving axles of the vehicle are located perpendicular to the longitudinal axis of the driving engine. The axis of the driving axles passes through the crankcase in the region between the two crankshaft main bearings so that the center of gravity may be lowered.

Partitions may be provided in the housing walls to accommodate separate compartments for the crankshaft, the differential gear unit, and the transmission. These compartments may be filled with lubricants of different viscosities and composition.

The clutch input shaft is driven by a set of three gears in which the center gear is keyed to the camshaft. The clutch input may also be driven by a chain, a belt, or any flexible element that is positively connected with the camshaft driving gear.

A clutch is coaxially disposed in the power train between the engine output and the transmission. In a unitized power plant constructed in accordance with this invention, the flywheel may be disposed on the engine end opposite from the clutch input gear train.

Figure 3:
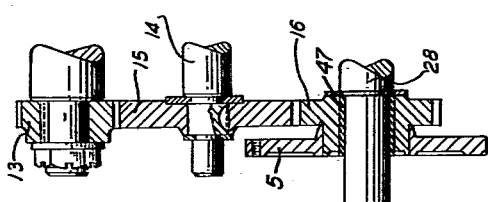
Figure 2:
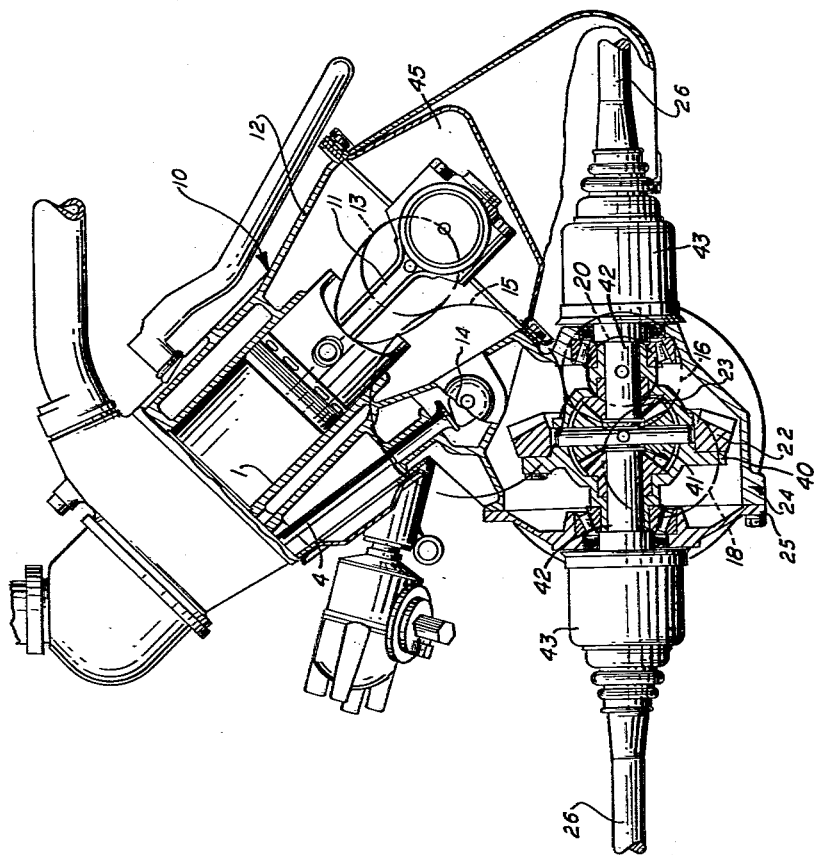
Figure 4:
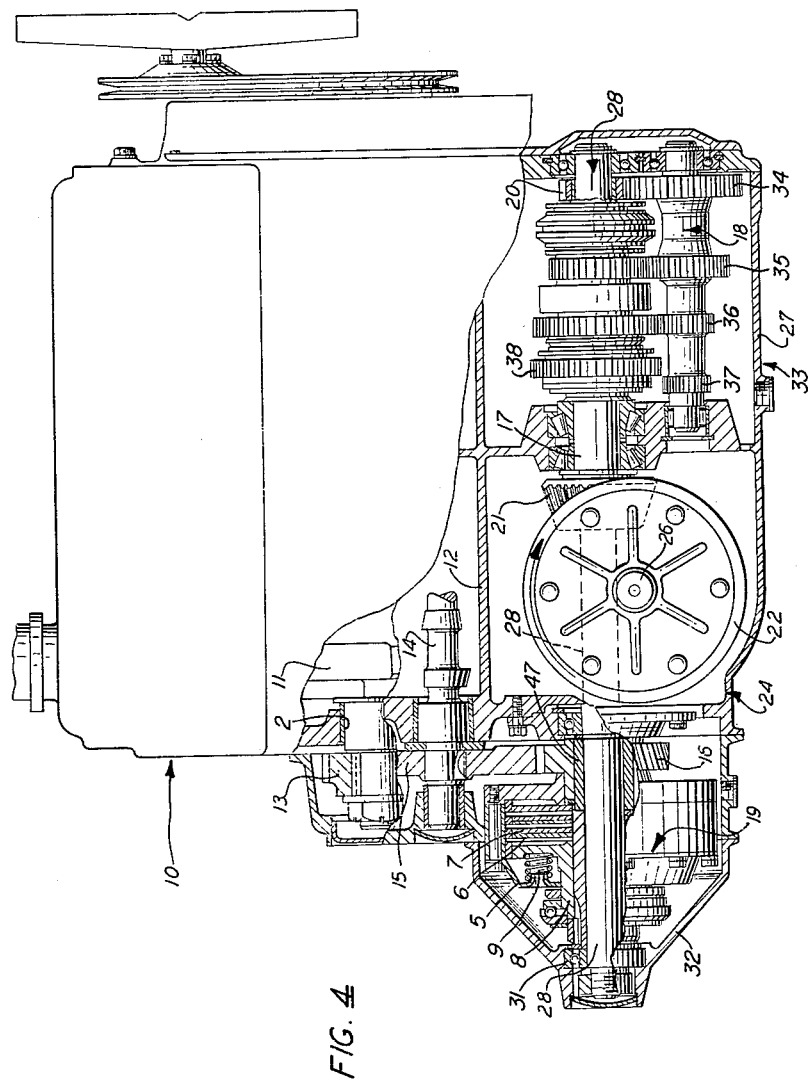

The objects and advantages of this invention will best be understood after consideration of the following detailed description and the accompanying drawings in which:

FIGURE 1 is a side elevational view partly in section of the presently preferred embodiment, FIGURE 2 is a front elevational view taken along section lines 2—2 of FIGURE 1, FIGURE 3 is an enlarged side elevational view showing a portion of the gear train of FIGURE 1, and FIGURE 4 is a side elevational view partly in section showing a modification of the invention illustrated in FIGURE 1.

Referring now to the drawings for a detailed description of this invention, wherein like reference numerals identify like parts throughout the various views, an integrated power plant suitable for vehicle propulsion is disclosed in FIGURE 1. As illustrated in this embodiment, the engine 10 has four cylinders 1 with their centers arranged in a single plane that is tilted approximately 45° to the vertical.

The power plant of FIGURE 1 has an engine 10 that includes a crankshaft 11 which is supported by a rear main bearing 2, a middle main bearing 3 and a front main bearing 29. Gear 13 is keyed to the left-hand or rear end of the crankshaft 11. A camshaft 14 is journalled in the block 12 of the engine 10 to one side of the cylinder bank and crankshaft 11. Camshaft 14 is provided with a gear 15 that is in driving engagement with the driven gear 13 of the crankshaft 11. Camshaft 14 operates the intake and exhaust valves of the engine 10 by means of push rods 4 (see FIGURE 2). The angular relationship between gear 15 and gear 13 is preset so that the valve opening and closing function will be timed correctly for proper engine operation.

The power plant includes a disc clutch 19 situated beneath camshaft gear 15 and rearwardly thereof. Camshaft gear 15 drivingly engages clutch input gear 16 which in turn is connected to a carrier structure 5 that supports a series of clutch discs 6. A second set of discs 7 are affixed to a member 8 secured to the clutch output shaft 28 and complement the discs 6 of the carrier structure 5. Spring pressed actuating means 9 are provided for the selective engagement of the input and output discs 6 and 7 of the clutch 19. Appropriate bearings 31 are provided for rotation of the input and output components in the clutch housing 32. A sleeve bearing 47 supports the gear 16 on the shaft 28.

Clutch output shaft 28 constitutes the input shaft of the transmission 33 and supports transmission input gear 20. The transmission 33 is of the conventional sliding gear variety and has a lay shaft 18 formed with a plurality of stepped gears 34, 35, 36 and 37. The main output shaft 17 of the transmission is in axial alignment with the shaft 28 of the clutch and is geared to be engageable with the gears of the lay shaft 18.

Gears such as at 38 are provided on the shafts 28 and 17 for engagement with the gears on the lay shaft 18 to provide a plurality of selectable gear ratios in a conventional fashion. The output shaft 17 of the transmission 33 is supported by a bearing 39 and carries a differential pinion 21 that engages ring gear 22 secured to the differential carrier 40. The differential gears 41 carried by the carrier engage side gears 23. The side gears 23 are splined to shaft members 42 journalled within the differential housing portion 24 of the block and in the differential housing cover 25. The shaft members are connected by universal joints 43 to half-shafts or axles 26 that extend laterally to the driving wheels of the vehicle with which this power unit is associated.

With reference to FIGURE 1 it can be seen that the differential and transmission portions 19, 33 of the mechanism are contained within the housing for the engine 10 between the front and rear main bearings 2 of the crankshaft 11. The compactness of the unit is further enhanced by inclining the cylinder bank which in the illustration is approximately 45° to the vertical. The flywheel 44 for the engine 10 is placed on the front of the engine, i.e., on the end of the crankshaft 11 opposite from the gear train 13, 15 and 16.

The housing is partitioned into separate compartments so that the transmission 33, differential 24 and crankcase 45 may contain different lubricants if desired.

A modification of the invention is shown in FIGURE 4 which permits positions of the center of gravity of the engine forwardly rather than rearwardly of the driving axles. The construction of the power unit of FIGURE 4 is generally similar to that of FIGURE 1 except that the transmission and differential gear units 33 and 24 have been reversed. In this modification the output shaft 28 of the clutch passes through the pinion gear 21 which is hollow and coaxial about the shaft 28. The transmission output 17 engages the shaft 28 supporting the differential pinion 21. The transmission is identical to the one of FIGURE 1 except for the coaxial shaft feature.

Further modifications of this invention may occur to those skilled in the art which will come within the scope and spirit of the following claims.

What is claimed is:

1. An integrated power unit for a motor vehicle comprising in combination an engine having a crankshaft;
   a clutch, a transmission and a differential operatively interconnected and each having rotatable input members;
   said clutch, transmission and differential input members having a common axis of rotation;
   said axis of rotation being arranged parallel to the axis of rotation of said crankshaft;
   said crankshaft having fore and aft main bearings;
   said transmission and differential being serially arranged and located substantially between vertical planes passing through said main bearings;
   said crankshaft having a flywheel connected to one of its ends and a power output gear connected to the other of its ends;
   a series of gears connecting said power output gear to said clutch input member;
   said engine having a rotatable camshaft supporting one of said gears in said series of gears for rotation therewith;
   said engine having a plurality of cylinders inclined to a vertical plane passing through said crankshaft;
   said common axis being disposed beneath and to one side of said crankshaft.

2. An integrated power unit for a motor vehicle comprising in combination an engine having a crankshaft;
   a clutch, a transmission and a differential operatively interconnected and each having rotatable input members;
   said clutch, transmission and differential input members having a common axis of rotation;
   said axis of rotation being arranged parallel to the axis of rotation of said crankshaft;
   said crankshaft having fore and aft main bearings;
   said transmission and differential being serially arranged and located substantially between vertical planes passing through said main bearings;
   said crankshaft having a power output gear connected to one of its ends;
   a series of gears connecting said power output gear to said clutch input member;
   said engine having a rotatable camshaft supporting one of said gears in said series of gears for rotation therewith.

3. An integrated power unit for a motor vehicle comprising in combination an engine having a crankshaft;
   a clutch, a transmission and a differential operatively interconnected and each having rotatable input members;
   said transmission and differential input members having a common axis of rotation;
   said axis of rotation being arranged parallel to the axis of rotation of said crankshaft;
   said crankshaft having a power output gear connected to one of its ends;
   a series of gears connecting said power output gear to said clutch input member;
   said engine having a rotatable camshaft supporting one of said gears in said series of gears for rotation therewith.

4. An integrated power unit for a motor vehicle comprising in combination an engine having a crankshaft;
   a clutch, a transmission and a differential operatively interconnected and each having rotatable input members;
   said clutch, transmission and differential input members having a common axis of rotation;
   said axis of rotation being arranged parallel to the axis of rotation of said crankshaft;
   said crankshaft having fore and aft main bearings;
   said transmission and differential being serially arranged and located substantially between vertical planes passing through said main bearings;
   means operatively connecting said crankshaft to one of said input members.

5. An integrated power unit for a motor vehicle comprising in combination an engine having a crankshaft;
   a clutch, a transmission and a differential operatively interconnected and each having rotatable input members;
   said clutch, transmission and differential input members having a common axis of rotation;
   said crankshaft having fore and aft main bearings;
   said transmission and differential being serially arranged and located substantially between vertical planes passing through said main bearings;
   means operatively connecting said crankshaft to one of said input members.

6. An integrated power unit for a motor vehicle comprising in combination an engine having a crankshaft;
   a clutch, a transmission and a differential operatively interconnected and each having rotatable input members;
   said clutch, transmission and differential input members having a common axis of rotation;
   said crankshaft having fore and aft main bearings;
   said transmission and differential being serially arranged and located substantially between vertical planes passing through said main bearings;
   means operatively connecting said crankshaft to one of said input members;
   said engine having a plurality of cylinders inclined to a vertical plane passing through said crankshaft;
   said common axis being disposed beneath and to one side of said crankshaft.

7. An integrated power unit for a motor vehicle comprising in combination an engine having a crankshaft;
   a clutch, a transmission and a differential operatively interconnected and each having rotatable input members;
   said crankshaft having a flywheel connected to one of its ends and a power output gear connected to the other of its ends;
   a series of gears connecting said power output gear to one of said input members;
   said engine having a rotatable camshaft supporting one of said gears in said series of gears for rotation therewith.

8. An integrated power unit for a motor vehicle comprising in combination an engine having a crankshaft;
   a clutch, a transmission and a differential operatively interconnected and each having rotatable input members;

said clutch, transmission and differential input members having a common axis of rotation;
said crankshaft having fore and aft main bearings;
said transmission and differential being serially arranged and located substantially between vertical planes passing through said main bearings;
means operatively connecting said crankshaft to one of said input members.

References Cited in the file of this patent

UNITED STATES PATENTS

| | | |
|---|---|---|
| 1,552,169 | Kenen | Dec. 15, 1916 |
| 1,808,109 | Heinze | Oct. 24, 1928 |

FOREIGN PATENTS

| | | |
|---|---|---|
| 259,011 | Switzerland | June 1, 1949 |
| 847,302 | Great Britain | Sept. 7, 1960 |